United States Patent

[11] 3,634,693

[72] Inventors George G. T. Broussaud;
Erich Spitz, both of Paris, France
[21] Appl. No. 11,973
[22] Filed Feb. 17, 1970
[45] Patented Jan. 11, 1971
[73] Assignee Thomson-CSF

[54] BANDWIDTH COMPANDOR SYSTEM
11 Claims, 6 Drawing Figs.

[52] U.S. Cl. .......... 250/216, 350/161, 250/219 Q
[51] Int. Cl. .......... G02f 1/28
[50] Field of Search .......... 350/161, 162, 160, 167; 250/216, 226, 220, 219 Q

[56] References Cited
UNITED STATES PATENTS
3,306,977 2/1967 Brueggemann .......... 350/161
3,483,387 12/1969 Davis .......... 350/161

*Primary Examiner*—Walter Stolwein
*Attorney*—Cushman, Darby & Cushman

ABSTRACT: In order to narrow the bandwidth of a communication channel through which electrical signals are to be transmitted the latter are passed through an electro-optical device comprising double-diffraction optical system employing monochromatic light. The double-diffraction system is equipped with an electro-optical modulator to which the electrical signals are applied and a photoelectric transducer collects the spatially modulated monochromatic light after filtering therefrom of certain spectrum components, the remaining spectrum components having been juxtaposed.

BANDWIDTH COMPANDOR SYSTEM

The present invention relates to band compressor devices which make it possible to transmit within a restricted frequency band, electrical signals, the frequency spectra of which occupy a wider frequency band. This band compression is carried out by removing from the spectrum of an electrical signal, certain parts thereof which, parts are considered to be superfluous or of secondary interest for the correct retrieval of the information which the signal contains. The essential spectrum portions of the signal are then reassembled within a restricted frequency band. In order to achieve band compression, filtering and frequency-changing arrangement may be used. However when the number of the essential spectrum portions is high, such arrangements may become complex and their adjustment is very delicate.

It is an object of the invention, to avoid such difficulties.

According to the invention there is provided an electro-optical bandwidth compressor arrangement capable of converting an electrical signal of predetermined bandwidth into another signal of reduced bandwidth, said arrangement comprising: a source of monochromatic energy for supplying a beam of coherent radiation, electro-optical modulator means positioned for intercepting said beam and having an input for receiving said electrical signal, first stigmatic optical means for intercepting said beam for forming an image of said source, an optical filter having N parallel slots lying in the image plane of said first stigmatic means, N stigmatic optical elements respectively facing said N slots for projecting into a further image plane, juxtaposed images of said slots, second stigmatic optical means positioned for receiving the coherent radiation emerging from said further image plane and photoelectric means for collecting the coherent radiation emerging from said second stigmatic optical means and delivering said signal of reduced bandwidth.

Figure 1:
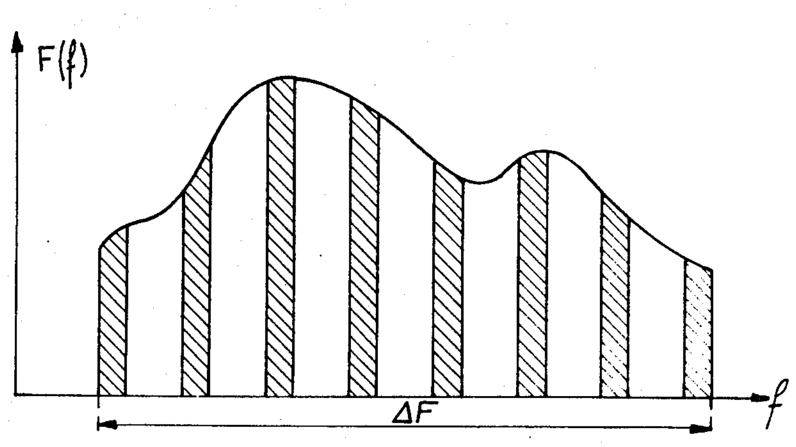
Figure 2:
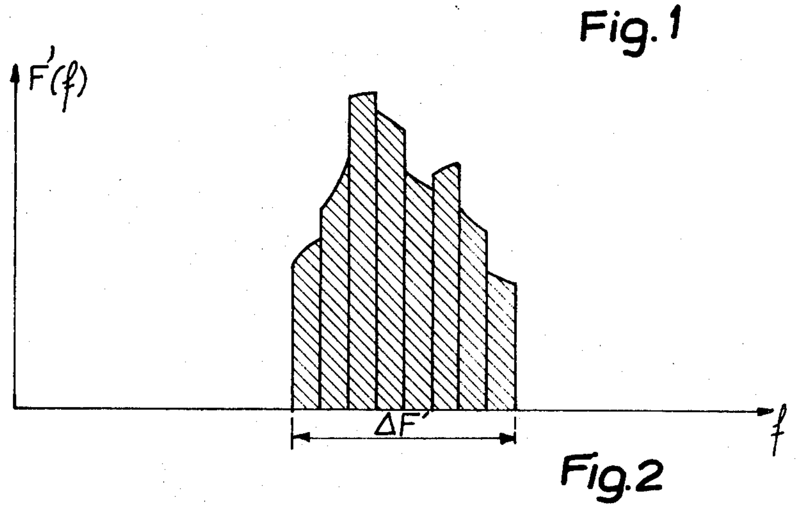
Figure 3:
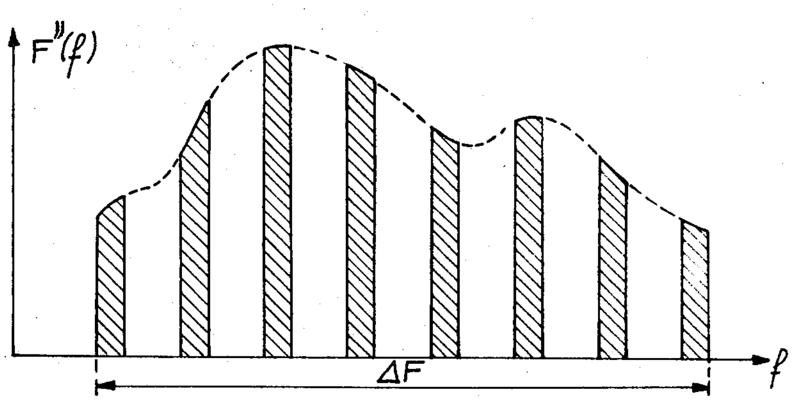
Figure 4:
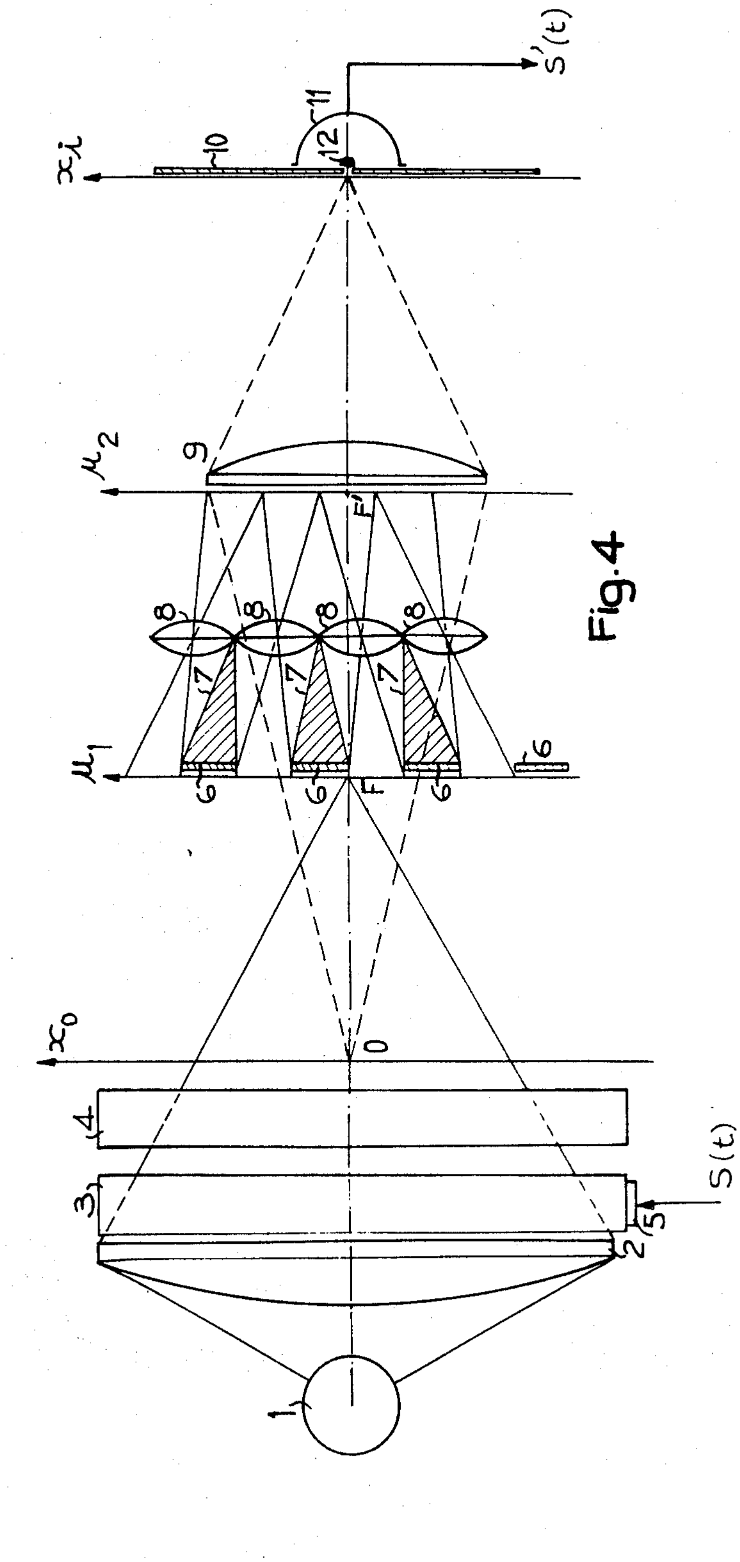
Figure 5:
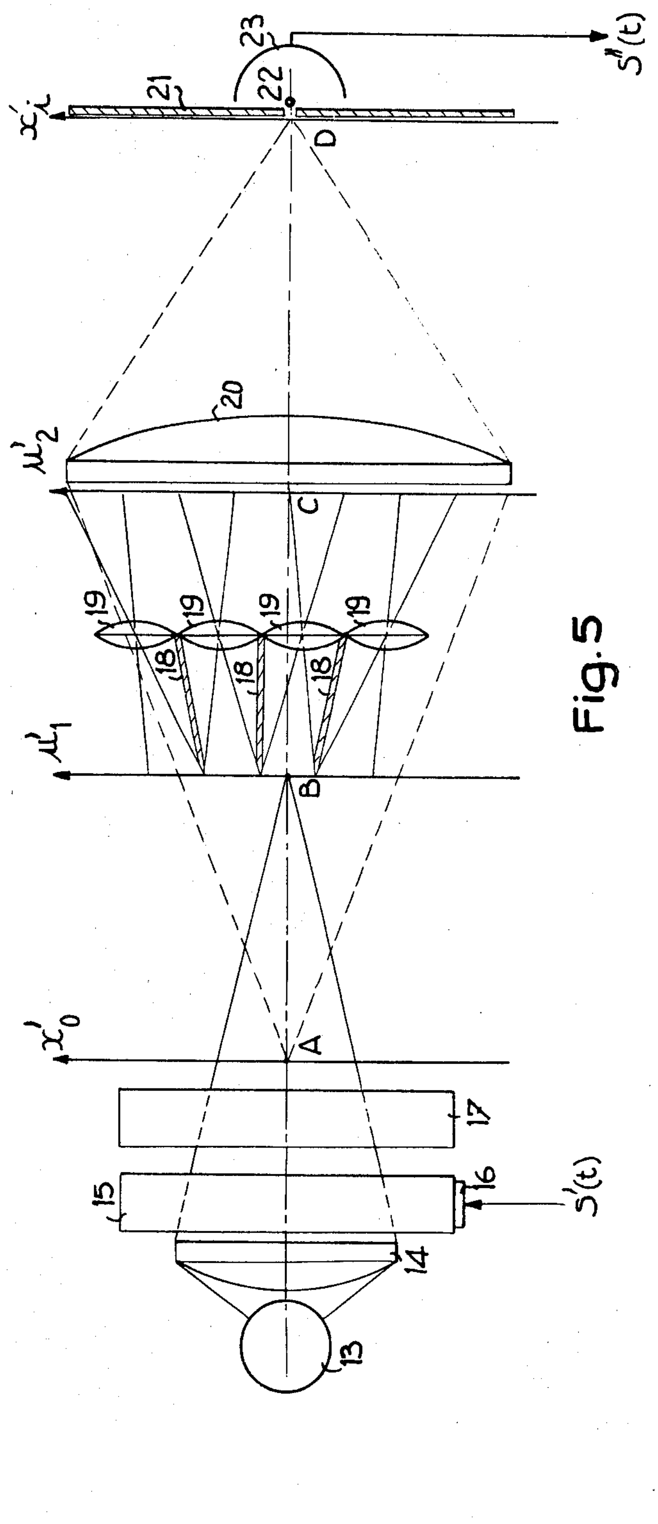
Figure 6:
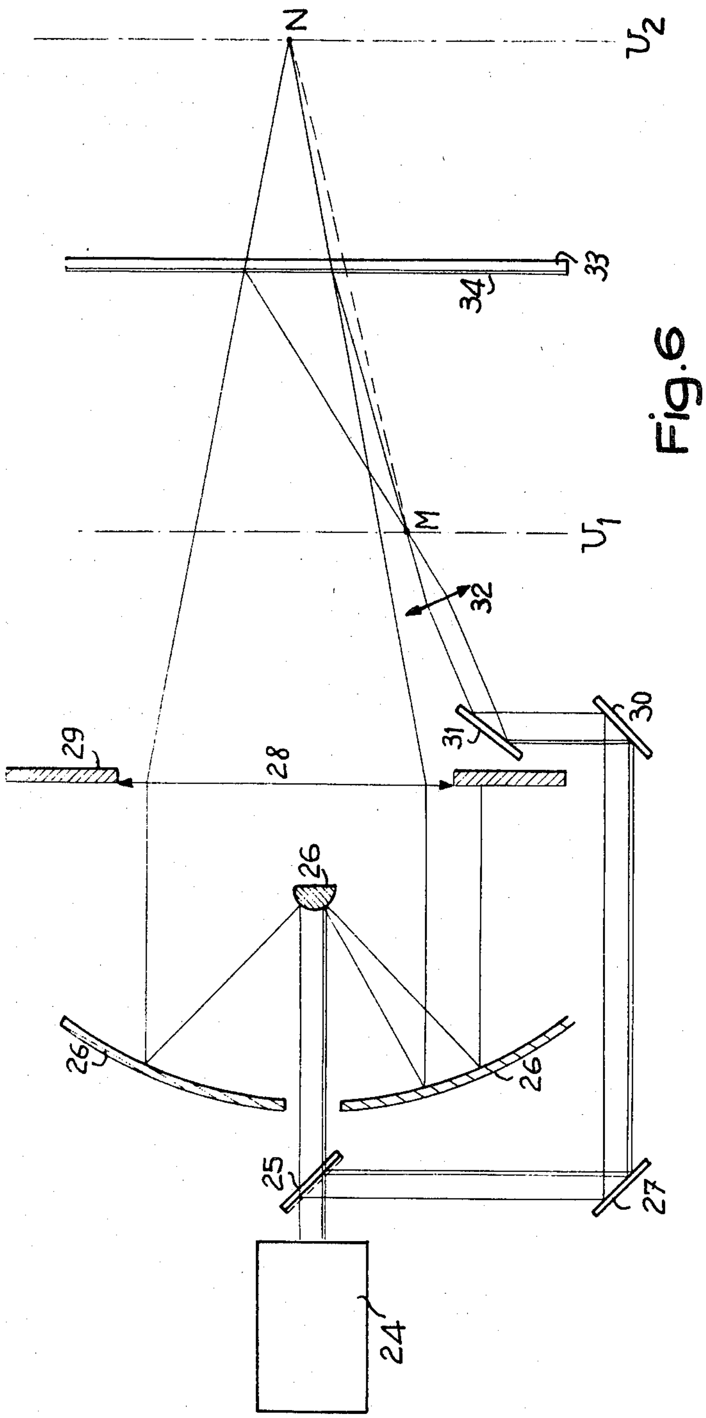

For a better understanding of the invention and to show how the same may be carried into effect reference will be made to the drawing appended to the ensuing description and in which, FIGS. 1, 2 and 3 are explanatory diagrams;

FIG. 4 schematically illustrates an electro-optical spectrum compression system in accordance with the invention;

FIG. 5 schematically illustrates an electro-optical system capable of carrying out a spreading operation which is the reverse of the compression operation effected by the electro-optical system of FIG. 4; and FIG. 6 schematically illustrates an optical arrangement for building up a system of holographic lenses, for use in the systems of FIGS. 4 and 5.

The invention is based upon the property possessed by diffraction systems, of producing the Fourier transform of a signal, that is to say its spectrum of frequencies. Considering a point, monochromatic light source and a lens projecting the image of said source onto a plane $(u, v)$, those skilled in the art will readily understand that the function which represents the variations in illumination of the plane $(u, v)$ is the two-dimensional Fourier transform of the function which, in a given plane $(x_o, y_o)$ close to the lens, represents the distribution of the emergent light amplitudes from said plane. Thus, given an electrical signal $S(t)$ and an electro-optical system capable of producing in the plane $(x_o, y_o)$ a light amplitude distribution $S(x_o)$, there is obtained in the plane $(u, v)$ the spectrum of frequencies of the signal. The principle of this optical conversion system has been set out in detail by Georges Broussaud and Serge Lowenthal in a copending patent application for "-Signal Spectral Multiplexing System" filed in the U.S. Pat., Dec. 8, 1969, Ser. No. 882,880 and assigned to the same assignee as the present application.

In FIG. 1, the frequency spectrum $F(f)$ of a signal $S(t)$ has been illustrated within a frequency band $\Delta F$. Experience tells us that the spectral constituents distributed within the frequency band $\Delta F$ are not all essential to the correct reproduction of the information contained in the signal $S(t)$; to insure a satisfactory retrieval of the information carried by the signal $S(t)$ it is sufficient to transmit only the crosshatched portions of the spectrum as shown in FIG. 1. This realization means that the bandwidth of the spectrum $F(f)$ of FIG. 1 can be restricted by arranging adjacently to one another those spectral sections which are transmitted. As shown in FIG. 2, a compressed spectrum $F'(f)$ comprising side by side the crosshatched spectrum sections of FIG. 1, is then obtained. The spectrum $F'(f)$ of FIG. 2 has a bandwidth $\Delta F'$ which is less than $\Delta F$ and corresponds to a signal $S'(t)$. In order to exploit the information carried within the compressed signal $S'(t)$, it is necessary to space apart the spectral sections which form it; this operation is the reverse of the foregoing operation and results in the production of a signal $S''(t)$ whose frequency spectrum $F''(f)$ is shown in FIG. 3.

In FIG. 4, there is schematically illustrated a spectrum compression device in accordance with the invention. It comprises a monochromatic light source 1, associated with a first lens 2 capable of causing the light emitted from the source 1 to converge at F.

The light beam emerging from the lens 2 is optically modulated by means of an electro-optical device consisting, for example, of a transparent strip 3, associated with an electromechanical transducer 5 and a phase contrast filter 4. Under the action of the signal $S(t)$ applied to the transducer 5, the strip 3 undergoes a deformation which propagates as a wave in the direction $ox_o$ at the phase velocity $c$. The refractive index of the strip 3 varies under the influence of the deformation, and these variations in refractive index are converted into variations in amplitude of the light beam emerging from the object plane $ox_o$. In the object plane $ox_o$, a light amplitude distribution $S(x_o-ct)$ is obtained. In the plane, passing through F an illumination which corresponds to the Fourier transform function, i.e., to the frequency spectrum of the signal $S(t)$ is achieved. A filter grid 6 is located in this plane in order to select the desired spectrum portions of the signal. The grid 6, in conjunction with a plurality of lenses 8 whose respective fields are limited by masks 7, forms an optical translator device. This device is capable of setting up side by side in the plane $u_2$, the images corresponding to the spectrum portions transmitted through the gaps 1 of the grid 6.

There is thus obtained in the plane $u_2$ an illumination representative of the compressed spectrum of the signal $S(t)$. A lens 9 located at the output of the optical translator device 6, 7, 8, forms in the image plane $x_i$, the Fourier transform of the compressed spectrum; thus, a luminous signal $S'(x_i-ct)$ is obtained which only needs to be converted into an electrical signal $S'(t)$. To this end, the signal $S'(x_i-ct)$ is received through the slot 12 of diaphragm 10. A photoelectric transducer 11 is located in front of the slot 12 on the opposite side of the diaphragm 10 in order to produce the electrical signal $S'(t)$ corresponding to the signal $S(t)$.

FIG. 5 shows an optical arrangement which can carry out upon the signal $S'(t)$, an operation which is the reverse of that of spectral compression. This device produces a signal $S''(t)$, the spectrum of which is the spectrum of the signal $S(t)$ except that spectral portions not contained in the signal $S'(t)$ have been eliminated.

The arrangement of FIG. 5 comprises a monochromatic light source 13, a first lens 14, a transparent strip 15, an electromechanical transducer 16 and an optical phase contrast filter 17. The elements 13, 14, 15, 16 and 17 cooperate in the same way as the elements 1, 2, 3, 4 and 5 of FIG. 4, in order to form in the plane defined by the line $x'_0$ a light amplitude distribution $S'(x'_0-ct)$.

In the plan $u'_1$, the illumination obtained is the Fourier transform of the distribution $S'(x'_0-ct)$; this plane receives the image of the compressed spectrum of signal $S'(t)$. Between the plane $u'_1$ and the plane defined by the line $u'_2$ is inserted an optical translator device which comprises lenses 19 associated with masks 18, for separating from one another, as shown in FIG. 5, the spectrum portion contained in the compressed spectrum.

The expanded spectrum obtained in the plane $u'_2$ experiences again a diffraction on passage through a lens 20. This lens provides in the image plane $x'_1$ the Fourier transform of the expanded spectrum, in other words the luminous signal S'' $(x'_1-ct)$. A slot 22 formed in a diaphragm 21 receives the diffracted radiation and a photoelectric transducer 23 converts it into the signal S'' $(t)$.

In FIGS. 4 and 5, the optical devices for translating the spectrum portions, respectively use lens assemblies 8 or 19 in order to form juxtaposed images of several separate objects, or vice-versa.

A variant embodiment of the optical translator device in accordance with the invention consists in the substitution for the lens groups 8 and 19, of a transparent material in which two-dimensional or three-dimensional sets of fringes constituting a plurality of holographic lenses, have been formed. This technique, applicable with monochromatic light, has been described in a copending patent application for "Optical System for reading out stored information" filed in the U.S. Patent Office, June 6, 1969, Ser. No. 834,406, and also assigned to the same assignee.

The advantage of holographic lenses is that when three-dimensional sets or networks of fringes are used, the masks otherwise employed to limit the field of the lenses, can be dispensed with. In other words, the three-dimensional network has the property of producing only one image of an object. This property has been described by P. J. Van Heerden, in the publication: "Theory of Optical Information Storage in Solids" which appeared in: "Applied Optics, pp. 393–400, Apr. 1963, Vol. 2, No. 4."

FIG. 6 shows an optical device for manufacturing the holographic plate used in the optical translator device hereinbefore referred to. The device shown in FIG. 6 comprises a light source 24 emitting a beam of monochromatic light; the beam is split by a semitransparent mirror 25 into two subsidiary beams which are respectively received by an afocal reflective device 26 and by a mirror 27. The beam emerging from the afocal system 26 is received by a lens 28 carried in a mount 29; the lens 28 converges the beam onto the point N in the plane defined by the line $U_2$; the beam coming from the mirror 27 is successively reflected by the mirrors 30 and 31 and finally arrives at the lens 32 which converges it onto the point M in the plane defined by the line $U_1$.

By arranging a photographic plate 33 carrying a sensitive emulsion 34, between the planes $U_1$ and $U_2$, it is possible to receive upon one and the same portion thereof the convergent beam coming from the lens 28 and the divergent beam coming from the point M; the interference between these beams enables the local recording of a network of fringes to be effected. This kind of network, after development of the plate 33, behaves in the manner of a stigmatic optical system. The image of a luminous object centered about the point M will be formed about the point N as if there were a lens on the axis MN. By producing successive displacements of the lenses 28 and 32 in order to create several networks of fringes, a hologram can be created having the same properties as the assemblies of lenses represented in FIG. 4 and 5. FIG. 6 illustrates that the hologram thus formed has an object plane $U_1$ and an image plane $U_2$. These planes $U_1$ and $U_2$ must correspond respectively to the planes $Fu_1$ and $F'u_2$ of FIG. 4, and to the planes $Bu'_1$ and $Cu'_2$ of FIG. 5.

Without departing from the scope of the invention, it goes without saying that the electro-optical system 3, 4, 5 of FIG. 4 and the system 15, 16, 17 of FIG. 5 can be replaced by others which effect the same kind of optical modulation. In particular, the electro-optical system described in the copending patent application for "Signal Spectral Multiplexing System" filed in the U.S. Patent Office, Dec. 8, 1969, Ser. No. 882,880 and assigned to the same assignee, can also be used in the arrangements of FIGS. 4 and 5.

Considering FIG. 4, the optical modulation of the beam emerging from the lens 2 can be effected by substituting for the elements 3, 4 and 5, a closed strip of photochromic material moving at constant speed past an electro-optical modulator. By applying the signal S $(t)$ to the said modulator, the transparency of the loop is subjected to a modulation by which it is possible to produce in the plane $x_0$ the light amplitude distribution S $(x_0-ct)$; after passing through the field of the lens 2, an erasing device makes it possible to return the photochromic material to its initial state of transparency.

What is claimed is:

1. An electro-optical bandwidth compressor arrangement capable of converting an electrical signal of predetermined bandwidth into another signal of reduced bandwidth, said arrangement comprising:
- a source of monochromatic energy for supplying a beam of coherent radiation,
- electro-optical modulator means positioned for intercepting said beam and having an input for receiving said electrical signal, thereby modulating said beam in accordance with said electrical signal,
- first lens means for intercepting said beam for forming an image of said source,
- an optical filter having N parallel slots lying in the image plane of said first lens means,
- N lens means respectively facing said N slots for projecting into a further image plane, juxtaposed images of said slots,
- second lens means positioned for receiving the coherent radiation emerging from said further image plane, and
- photoelectric means for collecting the coherent radiation emerging from said second lens means and delivering said signal of reduced bandwidth.

2. A bandwidth compressor as in claim 1, wherein said N lens means comprise N lenses of a refractory material.

3. A bandwidth compressor as in claim 1, wherein said N lens means comprise N holographic lenses carried on a plate facing said optical filter.

4. A bandwidth compressor as in claim 1, wherein said electro-optical modulator means comprises an elongated transparent delay line, an electromechanical transducer located at one end of said line, and phase contrast optical means coupled to the transparent body of said line; said photoelectric means comprising a diaphragm and a photoelectric transducer positioned behind the aperture of said diaphragm.

5. A bandwidth compressor as in claim 1, wherein said first and second lens means are converging lenses.

6. An electro-optical band expandor arrangement wherein an electrical signal of reduced bandwidth is converted into an electrical signal of wider bandwidth, said expander arrangement comprising:
- a source of monochromatic energy for supplying a beam of coherent radiation,
- electro-optical modulator means positioned for intercepting said beam and having an input for receiving said reduced bandwidth signal thereby modulating said beam in accordance with said reduced bandwidth signal,
- first lens means for intercepting said beam and for forming into an image plane an image of said source,
- N coplanar lens means positioned side by side for forming into a further image plane N separated images respectively corresponding to N juxtaposed rectilinear portions of said image plane,
- masking means associated with said N lens means,
- second lens means positioned for receiving the coherent radiation emerging from said separated images, and
- photoelectric means for collecting the coherent radiation emerging from said second lens means and delivering said signal of wider bandwidth.

7. A bandwidth expandor as in claim 6, wherein said N lens means comprise N lenses of a refractory material.

8. A bandwidth expandor as in claim 6, wherein said N lens means comprise N holographic lenses carried on a plate parallel to said image plane.

9. A bandwidth expandor as claimed in claim 6, wherein said electro-optical modulator means comprise an elongated transparent delay line, an electromechanical transducer located at one end of said line, and phase contrast optical means coupled to the transparent body of said line; said photoelectric means comprising a diaphragm and a photoelectric transducer positioned behind the aperture of said diaphragm.

10. A bandwidth expandor as in claim 6, wherein said first and second lens means are converging lenses.

11. A bandwidth compandor system comprising the combination of electro-optical bandwidth compressor and expandor arrangements;

said compressor arrangement being capable of converging an electrical signal of predetermined bandwidth into another electrical signal of reduced bandwidth and comprising a source of monochromatic energy for supplying a beam of coherent radiation, electro-optical modulator means positioned for intercepting said beam and having an input for receiving said electrical signal, thereby modulating said beam in accordance with said electrical signal, first lens means for intercepting said beam for forming an image of said source, an optical filter having N parallel slots lying in the image plane of said first lens means, N lens means respectively facing said N slots for projecting into a further image plane, juxtaposed images of said slots, second lens means positioned for receiving the coherent radiation emerging from said further image plane, and photoelectric means for collecting the coherent radiation emerging from said second lens means and delivering said electrical signal of reduced bandwidth;

said bandwidth expandor arrangement being capable of converting said electrical signal of reduced bandwidth into an electrical signal of wider bandwidth and comprising:

a source of monochromatic energy for supplying a beam of coherent radiation, electro-optical modulator means positioned for intercepting said beam and having an input for receiving said reduced bandwidth signal thereby modulating said beam in accordance with said reduced bandwidth signal, first lens means for intercepting said beam and for forming into an image plane an image of said source, N coplanar lens means positioned side by side for forming into a further image plane N separated images respectively corresponding to N juxtaposed rectilinear portions of said image plane, masking means associated with said N lens means, second lens means positioned for receiving the coherent radiation emerging from said separated images, and photoelectric means for collecting the coherent radiation emerging from said second lens means and delivering said signal of wider bandwidth;

wherein said signal of reduced bandwidth delivered by said compressor arrangement is fed to the input of said expandor arrangement and said separated images have, ignoring a constant factor, the same width and spacing as said slots.

* * * * *

UNITED STATES PATENT OFFICE
CERTIFICATE OF CORRECTION

Patent No. 3,634,693 Dated January 11, 1972

Inventor(s) Georges G. T. Broussaud; Erich Spitz

It is certified that error appears in the above-identified patent and that said Letters Patent are hereby corrected as shown below:

In the heading read "Inventors George G. T. Broussaud; Erich Spitz, both of Paris France" as -- Inventors Georges G. T. Broussaud; Erich Spitz, both of Paris, France--, read "Patented Jan. 11, 1971" as --Patented Jan. 11, 1972--, also add to the heading --Claims priority application France, February 21, 1969, P.V. 69/04473--.

Signed and sealed this 10th day of October 1972.

(SEAL)
Attest:

EDWARD M.FLETCHER,JR.
Attesting Officer

ROBERT GOTTSCHALK
Commissioner of Patents